May 27, 1952 L. J. ANECHIARICO 2,598,487
FISHING GAME
Filed June 23, 1949 2 SHEETS—SHEET 1
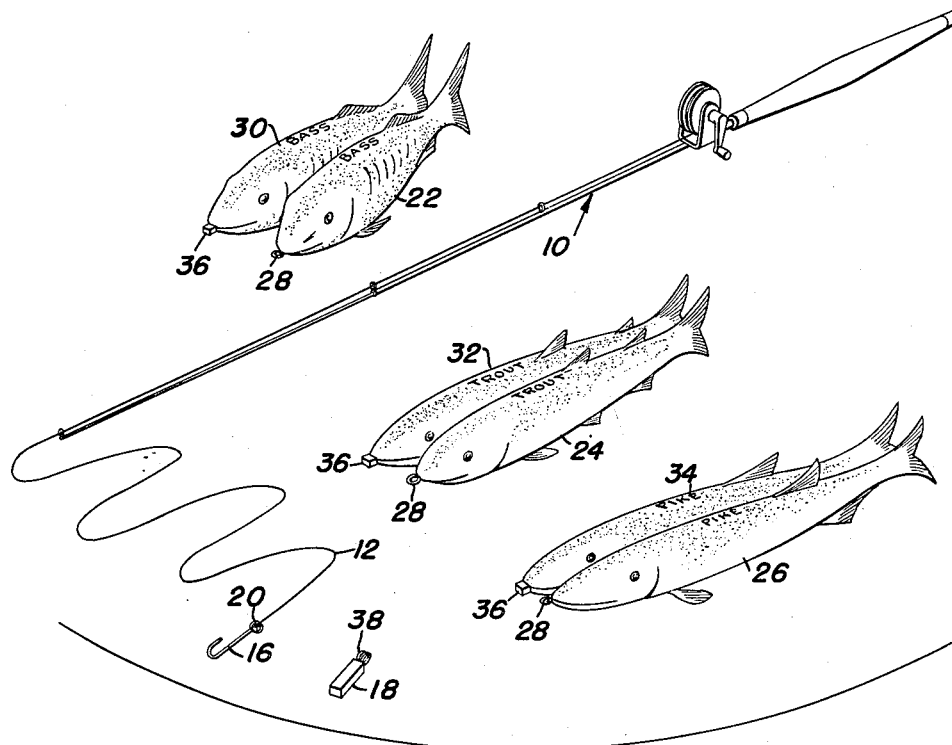
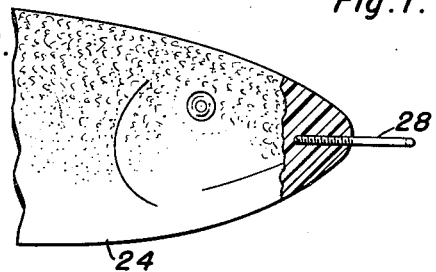
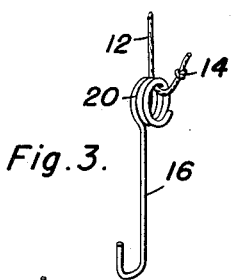
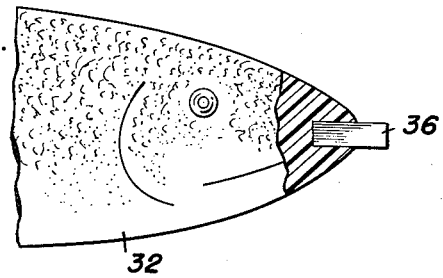
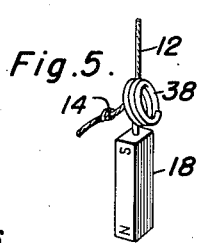
Inventor
Louis J. Anechiarico
By *Clarence A. O'Brien and Harvey B. Jacobson*
Attorneys May 27, 1952　　　L. J. ANECHIARICO　　　2,598,487
FISHING GAME Filed June 23, 1949　　　　　　　　　2 SHEETS—SHEET 2

Inventor
Louis J. Anechiarico

By Clarence A. O'Brien
and Harvey B. Jacobson
Attorneys

Patented May 27, 1952

2,598,487

UNITED STATES PATENT OFFICE 2,598,487

FISHING GAME

Louis J. Anechiarico, Endicott, N. Y.

Application June 23, 1949, Serial No. 100,794

1 Claim. (Cl. 273—140)

This invention relates to new and useful improvements and structural refinements in fishing games, and the principal object of the invention is to provide a highly entertaining and skillful game within artificial fish may be "caught" and pulled out of water by a fishing line in a realistic manner, even though the game is adapted to be played indoors or in other unnatural environments.

The above object is achieved by providing artificial fish with means for coaction with a "catching" element at the end of a fishing line, and an important feature of the invention involves the use of a catching element in the form of a magnet, adapted to attract and hold metallic members provided on or in the mouth of artificial fish, so that when the magnet suspended from a fishing line is brought in the vicinity of the metallic member, the fish is "caught" in a realistic manner and may be pulled out of water.

Another feature of the invention involves the provision of an artificial fish having an openable mouth containing metallic members and adapted to receive the fishing line magnet, the mouth of the artificial fish being normally open but becoming automatically closed by the attraction of the metallic members to the magnet, so that the fish actually appears to "bite" the magnetic catching element and may then be drawn out of the water by the fishing line.

Some of the advantages of the invention reside in its simplicity of construction, in its highly entertaining nature, and in its adaptability to economical manufacture.

With the above more important objects and features in view, and such other objects and features as may become apparent as this specification proceeds, the invention consists essentially of the arrangement and construction of parts as illustrated in the accompanying drawings, in which:

Figure 1 is a perspective view of the invention illustrating two different types of "catching" means;

Figure 2 is a fragmentary side elevational view of one of the fish shown in Figure 1 and illustrating one type of catching means;

Figure 3 is a fragmentary perspective view of a catching element on a fishing line, such as is intended to be used in combination with the fish shown in Figure 2;

Figure 4 is a fragmentary side elevational view, similar to that shown in Figure 2, but illustrating a second type of catching means;

Figure 5 is a perspective view of the catching element which is intended to be used in combination with the fish shown in Figure 4;

Like characters of reference are employed to designate like parts in the specification and throughout the several views.

Figure 6:
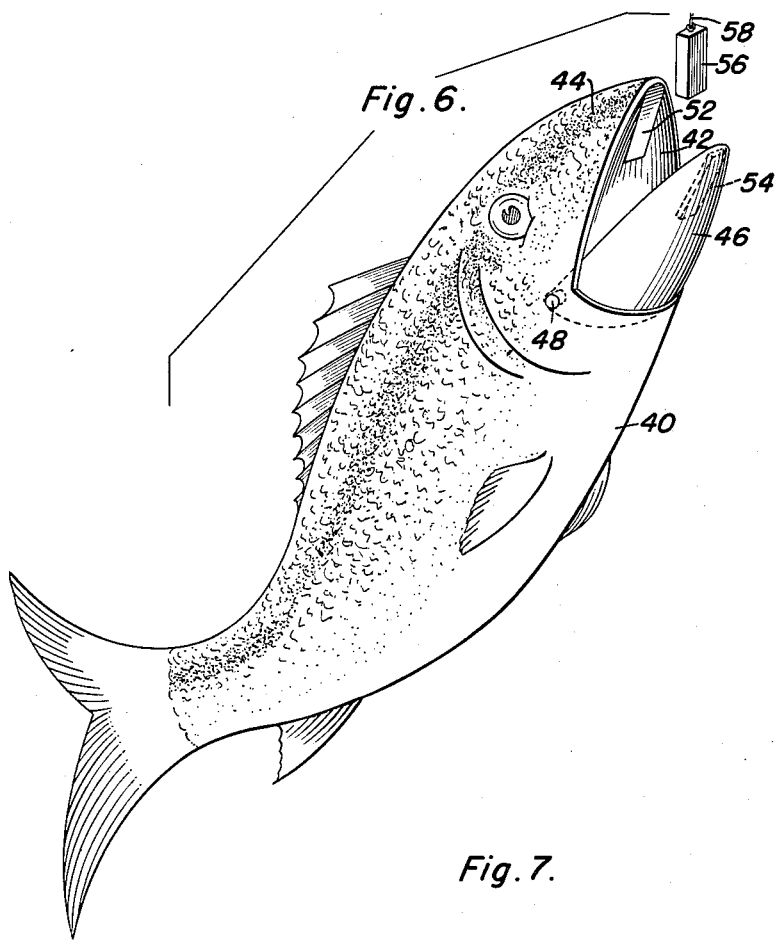
Figure 6 is a perspective view illustrating a modified embodiment of the invention.

Referring now to the accompanying drawings in detail, more particularly to Figures 1-5 thereof, the invention consists of a fishing game which includes a fishing rod designated generally by the reference character 10, provided with a fishing line 12, the free end portion of the latter preferably being knotted as at 14.

Catching elements 16, 18 are selectively attachable to the free end portion of the line 12, the element 16 simply consisting of a hook which is formed integrally with a coiled portion 20 so that the free end portion of the line 12 may be inserted and frictionally retained between the coils of the portion 20, as shown in Figure 3. By virtue of this arrangement the hook 16 may be readily applied to and removed from the fishing line, it being noted that the knot 14 on the fishing line prevents the line from sliding outwardly from the coils of the hook portion 20.

The artificial fish 22, 24, 26, etc. consist of a body which may or may not be buoyant, and which is provided at the mouth end thereof with a screw eye 28. Accordingly, when the game is played, the fish 22, 24, 26, etc. are placed in water, such as in a basin, or the like, after which an attempt is made to "hook" one of the fish by engaging the element 16 with the eye 28.

Alternatively or in addition, artificial fish 30, 32, 34, etc. may be provided, these being similar to the fish 22, 24, 26, etc., but being equipped with metallic members or plugs 36 in place of the aforementioned eyes 28.

These plugs are adapted to be attracted by the aforementioned magnet 18, which is simply a permanent magnet provided with a coiled or looped element 38 so that it may be readily attached to and detached from the fishing line 12 in the same manner as the hook 16.

Needless to say, the hook 16 and the magnet 18 are used individually and selectively with the same fishing rod and line, the magnet 18 being intended to attract the fish provided with the metallic plug 38 so that when one of such fish is caught, it may be pulled out of the water by the fishing line.

Figure 7:
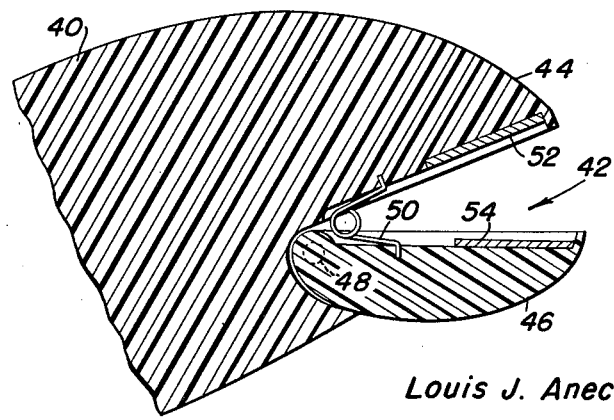
Figure 7 is a fragmentary cross-sectional detail of the artificial fish shown in Figure 6.

Referring now to the modified embodiment of the invention illustrated in the accompanying Figures 6 and 7, the artificial fish 40 herein is provided with an openable mouth 42 including what may be referred to as a stationary jaw 44 and a movable jaw 46, the latter being pivotally attached to the body of the fish as at 48 and a suitable spring 50 being interposed between the two jaws so as to urge the mouth to its open position, substantially as shown.

It is to be noted that the jaws 44, 46 are slightly dished or concaved on the interior thereof, so that a pair of metallic members or plates 52, 54, capable of being attracted by a magnet, may be secured to the inner surfaces of the respective jaws.

A permanent magnet 56, attached to a fishing line 58, is receivable in the open mouth 42 of the fish in which instance the close proximity of the metallic plates 52, 54 to the magnet will cause the jaws 44, 46 to close around the magnet, after which the fish as a whole may be withdrawn from the water by simply pulling the fishing line 58.

Needless to say, the openable mouth and the closing action thereof substantially enhance the realism of the "fishing" operation, it being, of course, understood that the magnet 56 is sufficiently strong to overcome the resiliency of the spring 50 to effect the closing of the mouth when the magnet is deposited therein.

It is believed that the advantages and use of the invention will be readily apparent from the foregoing disclosure and accordingly, further description thereof at this point is deemed unnecessary.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

In a fishing game, the combination of a fishing line, a magnet attached to said line, a fishlike body having an openable mouth including a stationary jaw and a pivoted jaw movable toward and away from the stationary jaw, a pair of metallic members capable of attraction by a magnet provided in opposing relation on said jaws, said magnet being receivable in said mouth and adapted to attract said members, whereby the mouth may be automatically closed and said body connected to said line, and a spring between said jaws for urging the same to an open position.

LOUIS J. ANECHIARICO.

REFERENCES CITED

The following references are of record in the file of this patent:

UNITED STATES PATENTS

| Number | Name | Date |
| --- | --- | --- |
| 1,271,021 | Deats | July 2, 1918 |
| 2,107,672 | Lang | Feb. 8, 1938 |
| 2,343,002 | Colaluca | Feb. 29, 1944 |
| 2,408,141 | Heil | Sept. 24, 1946 |